UNITED STATES PATENT OFFICE.

HERMANN SPRENGEL, OF GLOUCESTER STREET, BELGRAVE ROAD, ENGLAND.

IMPROVEMENT IN THE MANUFACTURE OF SULPHURIC ACID.

Specification forming part of Letters Patent No. 150,095, dated April 21, 1874; application filed April 4, 1874.

*To all whom it may concern:*

Be it known that I, HERMANN SPRENGEL, of Gloucester Street, Belgrave Road, in the county of Middlesex and Kingdom of England, have invented Improvements in the Production of Sulphuric Acid, of which the following is a specification:

In the production of sulphuric acid, as now generally adopted, it is necessary to introduce into the chambers jets of steam in order to effect the desired combination of the several gases employed for the production of sulphuric acid.

Now, this invention relates, first, to the employment, as a substitute for a jet or jets of steam, and employed in a manner similar thereto or in conjunction therewith, of water or of acidified aqueous solutions, either of sulphuric acid or of nitric acid, the same being converted by means of jets of steam, or by means of jets of air at an elevated pressure, or by any other means, into an exceedingly finely-divided condition of the fluid, or into spray, such finely-divided condition of the fluids employed acting in a manner similar to steam, as now employed, but forming an economical substitute therefor.

One other part of my invention consists in the employment of sulphuric acid in a finely-divided condition or spray for effecting the absorption of the oxides of nitrogen which are capable of absorption, and which are contained in or escape from the sulphuric-acid chambers.

Another part of my invention relates to the employment of sulphuric acid containing in solution either nitric acid, or those oxides of nitrogen which are capable of absorption by sulphuric acid, or mixtures of the same, in a finely-divided condition or as spray, so as to utilize the oxides of nitrogen contained therein for the production of sulphuric acids in the sulphuric-acid or leaden chambers.

One other part of my invention consists in the employment of weak or chamber acid in the form of spray produced in or injected into the leaden chambers, for the purpose of facilitating the collection and deposition of the finer particles of sulphuric acid which are separated in the atmosphere or interior of the chamber.

In carrying out the first part of my invention I employ leaden chambers, constructed in a manner similar to those now employed, or with such modifications as may be found in practice to be necessary, and I cause the aqueous or acid spray produced by any known means to be introduced in or about the same portions or parts of the chamber into which steam is now introduced, and which spray is to be injected in such proportion as that the combination of the gases may be effected and sulphuric acid be produced.

In carrying out the second part of my invention I effect the production of a sulphuric-acid spray by any known means for producing spray, and employ such spray for effecting the absorption of the nitrous fumes or oxides of nitrogen, by causing the acid spray to come in contact with the gaseous products escaping from the leaden chambers, such gases being made to pass through suitable chambers, into which the sulphuric-acid spray is injected, and which chambers are furnished with the necessary inlets and outlets, and such exit-pipes as may be necessary for the carrying off of the condensed or liquid acid.

In carrying out the third part of my invention sulphuric acid, containing the absorbed nitrous fumes or oxides of nitrogen from the leaden chambers, is introduced into the leaden chambers in the form of spray, and, by preference, at or about the same part or portion of the chamber into which the gases enter from the so-called kilns or apparatus in which the burning of sulphur or of pyrites, or of other sulphur material, is effected.

In carrying out the fourth part of my invention I cause weak or chamber acid in the form of spray to be injected into the leaden chamber in a manner similar to steam, and during the working of the chamber, so that the finer and more divided particles of sulphuric acid which are suspended in the chamber may be thereby collected and precipitated.

What I wish to be understood by the term spray is the employment of water or of acid in a fine state of division, or what is known as a vesicular or pulverized form, viz., in a form similar to that of mist, which may be obtained by the injection of steam or of air into a flow or a jet of water or of the acids, herein referred to, or by the impinging or coming into contact under pressure of converging jets of water or of acid, or which may be produced by any other means.

I claim—

1. The employment, as a substitute for a jet or jets of steam, or in conjunction therewith, of water, or of acidified aqueous solutions, either of sulphuric acid or so-called chamber-acid, or of nitric acid, the same being converted, by means of jets of steam, or by means of jets of air at an elevated pressure, or by any other means, into an exceedingly finely-divided condition of the fluid, or into spray, such finely-divided condition of the fluid employed acting in a manner similar to steam as now employed, but forming an economical substitute therefor.

2. The employment of sulphuric acid, in a finely-divided condition, or spray, for effecting the absorption of oxides of nitrogen contained in the gases escaping from the sulphuric-acid chambers.

3. The employment, in the leaden chambers, of sulphuric acid, containing in solution the absorbed oxides of nitrogen in a finely-divided condition or spray, so as to reutilize the oxides of nitrogen contained therein for the production of sulphuric acid.

4. The employment, in the leaden chambers, of weak or chamber acid in a finely-divided condition, or in the form of spray, in order to collect and precipitate the finer particles of sulphuric acid which are suspended in the chamber.

In witness whereof I have signed my name to this specification in the presence of two subscribing witnesses.

HERMANN SPRENGEL.

Witnesses:
  CHAS. MILLS,
    47 *Lincoln's Inn Fields, London.*
  FREDK. C. DYER,
    47 *Lincoln's Inn Fields, London.*